US009436510B2

(12) United States Patent
Couvee et al.

(10) Patent No.: US 9,436,510 B2
(45) Date of Patent: Sep. 6, 2016

(54) SYSTEM AND METHOD FOR MANAGING THE INTERLEAVED EXECUTION OF THREADS

(75) Inventors: Philippe Couvee, Villard-Bonnot (FR); Simon Derr, Saint Mrtin d'Heres (FR); Sylvain Jeaugey, Meylan (FR)

(73) Assignee: BULL SAS, Les Clayes-Sous-Bois (FR)

( * ) Notice: Subject to any disclaimer, the term of this patent is extended or adjusted under 35 U.S.C. 154(b) by 307 days.

(21) Appl. No.: 13/497,766

(22) PCT Filed: Sep. 15, 2010

(86) PCT No.: PCT/FR2010/051918
§ 371 (c)(1), (2), (4) Date: Mar. 22, 2012

(87) PCT Pub. No.: WO2011/036377
PCT Pub. Date: Mar. 31, 2011

(65) Prior Publication Data
US 2012/0185866 A1    Jul. 19, 2012

(30) Foreign Application Priority Data
Sep. 25, 2009    (FR) .................................... 09 56660

(51) Int. Cl.
*G06F 9/46*    (2006.01)
*G06F 9/50*    (2006.01)

(52) U.S. Cl.
CPC ........... *G06F 9/5077* (2013.01); *G06F 9/5044* (2013.01)

(58) Field of Classification Search
None
See application file for complete search history.

(56) References Cited

U.S. PATENT DOCUMENTS

| | | | | |
|---|---|---|---|---|
| 5,951,653 A * | 9/1999 | Hill et al. | ...................... | 719/315 |
| 6,216,173 B1 * | 4/2001 | Jones et al. | ................... | 715/705 |
| 6,901,522 B2 * | 5/2005 | Buch | ............................. | 713/320 |
| 7,389,506 B1 * | 6/2008 | Miller et al. | ..................... | 718/1 |
| 8,108,872 B1 * | 1/2012 | Lindholm et al. | ............ | 718/104 |
| 8,341,639 B2 * | 12/2012 | Lewis | .......................... | 718/104 |
| 8,527,988 B1 * | 9/2013 | Rhine | .............................. | 718/1 |
| 2004/0143833 A1 * | 7/2004 | Heyrman et al. | ............. | 718/100 |
| 2004/0207630 A1 * | 10/2004 | Moreton et al. | .............. | 345/543 |
| 2005/0108715 A1 * | 5/2005 | Kanai | ................... | G06F 9/4881 718/100 |
| 2006/0130062 A1 * | 6/2006 | Burdick et al. | ............... | 718/100 |

(Continued)

FOREIGN PATENT DOCUMENTS

WO    WO 2006/013438 A1    2/2006

OTHER PUBLICATIONS

Chong et al., "Enhanced Parallel Thread Scheduling for Java Based Applications on Multi-Core Architecture", 2008 International Conference on Advanced Communication Technology, ISBN 978-89-5519-136-3, Feb. 17-20, 2008, pp. 1144-1149.

*Primary Examiner* — Emerson Puente
*Assistant Examiner* — Mehran Kamran
(74) *Attorney, Agent, or Firm* — Pillsbury Winthrop Shaw Pittman LLP

(57) ABSTRACT

A computer system for managing the execution of threads including at least one central processing unit which performs interleaved execution of a plurality of threads throughout a plurality of virtual processors from said same central processing unit, and a handler for distributing the execution of the threads throughout the virtual processors.
The computer system further includes means for classifying threads to be executed according to several predetermined types, and the handler for distributing the execution of threads directs each thread to be executed to a virtual processor according to the type thereof.

12 Claims, 2 Drawing Sheets

(56) References Cited

U.S. PATENT DOCUMENTS

| | | | |
|---|---|---|---|
| 2006/0212868 A1* | 9/2006 | Takayama et al. | 718/100 |
| 2007/0271563 A1* | 11/2007 | Anand | G06F 9/5033 718/100 |
| 2008/0104593 A1* | 5/2008 | Parekh et al. | 718/100 |
| 2008/0134185 A1* | 6/2008 | Fedorova | 718/102 |
| 2008/0189709 A1* | 8/2008 | Amin | 718/102 |
| 2009/0183167 A1* | 7/2009 | Kupferschmidt et al. | 718/104 |
| 2009/0217276 A1* | 8/2009 | Brenner et al. | 718/102 |
| 2010/0269027 A1* | 10/2010 | Arimilli et al. | 714/799 |
| 2010/0275206 A1* | 10/2010 | Mewhinney et al. | 718/100 |
| 2010/0287556 A1* | 11/2010 | Munz | 718/102 |
| 2012/0198172 A1* | 8/2012 | Lin et al. | 711/129 |
| 2013/0268933 A1* | 10/2013 | Bhandari et al. | 718/1 |

* cited by examiner

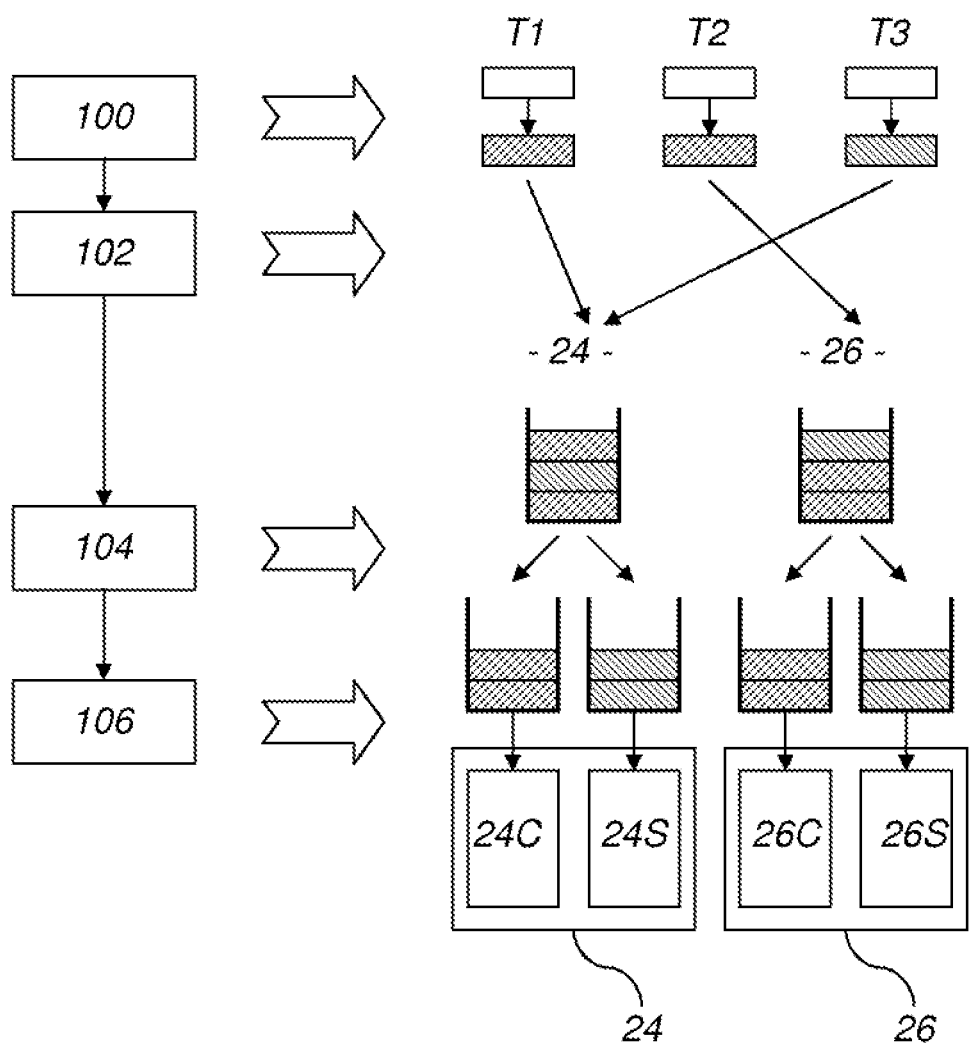

SYSTEM AND METHOD FOR MANAGING THE INTERLEAVED EXECUTION OF THREADS

FIELD OF THE INVENTION

The present invention relates to a computer system for managing the execution of threads, comprising at least one central processing unit having interleaved execution of a plurality of threads throughout a plurality of virtual processors from said same central processing unit, and a handler for distributing the execution of the threads throughout the virtual processors. It also relates to a corresponding method, to an application of this method to a cluster of servers, and to a computer program comprising instructions for the execution of this method.

BACKGROUND OF THE INVENTION

In the following description, "computer system" is understood as being any system capable of executing the instructions of a computer program, and for this purpose having at least one processor including at least one central processing unit, said central processing unit being further called calculation core of the processor or CPU. It will be noted that a processor may have only one calculation core, or a plurality of calculation cores. In an increasing order of complexity, a computer system according to the invention can be composed of a microprocessor with one or more calculation cores, a single microcomputer having one or more microprocessors, or a more complex arrangement in which a plurality of microcomputers are interconnected via a data transmission network. The complexity of a computer system in which the invention can be implemented depends primarily on the application to be carried out.

"Computer process," more generally referred to as "process," is understood as a set of instructions to be executed by a central processing unit (i.e. a calculation core) of a processor in a specifically allocated memory space, with the possible aid of other resources. Because a computer program itself is composed of a structured set of instructions, a computer process can then be considered as an instance of a computer program to be executed or as a portion of said computer program. Since the same program can be executed multiple times (in parallel, successively, on the same processor or on different processors), it can therefore generate a plurality of computer processes.

A computer process is not necessarily composed of a single linear sequence of instructions, but can call several of them asynchronously. "Thread" is then understood as such a linear sequence of instructions participating in the execution of a computer process. From the point of view of the execution of instructions, a computer process can therefore always be considered as being a thread or a set of threads.

"Central processing unit having interleaved execution of a plurality of threads throughout a plurality of virtual processors from said same central processing unit" is understood as being a central processing unit having a mechanism for increasing the parallel execution of threads by sharing some of its internal resources, particularly its execution pipeline, its registers and its cache memories. Such a central processing unit therefore has as many virtual processors as threads that can simultaneously share its resources. From the user's point of view, everything takes place as though, instead of only one central processing unit, there were several, more specifically as many as its number of virtual processors.

This mechanism is generally referred to as hyper-threading or simultaneous multi-threading. One objective of central processing units implementing this mechanism is to take advantage of periods of inactivity created by waiting for data from the shared memory space of a thread. Specifically, when a thread is in a waiting situation, the central processing unit that executes it goes automatically to executing another thread, thus giving the impression of having several different virtual processors.

The Linux (registered trademark) operating system currently supports such a mechanism and therefore presents the user, when it is executed on a microprocessor having a hyper-threading mechanism, with the N virtual processors from this microprocessor when this mechanism is activated. It also advantageously implements a load-balancing algorithm during the execution of threads which must therefore take into account the specificities of the virtual processors: in particular, a virtual processor should not be unloaded by switching the threads to another virtual processor of a same central processing unit. This limitation particularly burdens the load-balancing algorithm.

Specifically, this limitation is particularly problematic in applications of real-time calculation or embedded processing, for example for microprocessors involved in mobile telephone applications.

According to a second specific example, in a supercomputer environment of the HPC type (High Performance Computing) involving a plurality of processing nodes organized in clusters of servers, the user wishes to have even finer control of the placement of his applications on the central processing units, for example in order to take advantage of shared caches that favor one communication mechanism or another.

There are thus possibilities of fine placement of the threads via system calls of application programming interface for managing these threads, allowing a user (i.e. the programmer) to specify the behavior of a task scheduler of the operating system with respect to a thread; but for the application concerned, this involves having the knowledge of the topology of the computer system and carrying out a placement that can sometimes conflict with other software layers.

Indeed, taking into account the specificities of the virtual processors appears to be complex, and becomes truly problematic and even automatically unmanageable in an HPC supercomputer application.

It is therefore desirable to provide a system for managing the interleaved execution of threads that makes it possible to overcome at least partially the above-mentioned problems and limitations.

SUMMARY OF THE INVENTION

An object of the invention is therefore a computer system for managing the execution of threads, comprising at least one central processing unit having interleaved execution of a plurality of threads throughout a plurality of virtual processors from said same central processing unit, and a handler for distributing the execution of the threads throughout the virtual processors, characterized in that it comprises means for classifying the threads to be executed according to a plurality of predetermined types, and in that the handler for distributing the execution of the threads is designed for directing each thread to be executed to a virtual processor according to the type thereof.

Thus, by classifying the threads by types and systematically directing them to one virtual processor or another in accordance with their type by means of the handler for distributing the execution of the threads, the computing resources are preserved. The result is a better utilization of the central processing unit and an acceleration of the execution of the application concerned. Moreover, the risks of errors that could be caused by a user (the programmer) due to the hyper-threading mechanism are limited.

Optionally, a computer system according to the invention can further comprise means for associating each virtual processor from said same central processing unit with one of said predetermined types and the handler for distributing the execution of the threads can be designed to direct each thread to be executed to a virtual processor whose type is identical to the type thereof.

Thus, the handler for distributing threads is only concerned with selecting, if applicable, a central processing unit for a thread, the specific choice of a virtual processor then being automatically guided by the type of thread. The result is that the hyper-threading mechanism can be hidden to the user. There is therefore no longer any risk that the user could cause errors due to inadequate understanding of this mechanism. Furthermore, performance is increased because the threads are automatically directed to the proper virtual processors.

Also optionally, the central processing unit comprises two virtual processors, one associated with a first type of threads, the other associated with a second type of threads, and each computer process to be executed is either of the first type or of the second type.

Also optionally:
the first type of threads, referred to as "calculation," relates, for a program intended to be executed by the computer system so as to provide a result, to threads participating to the execution of this program for the direct production of the result, and
the second type of process, referred to as "service," relates to threads participating to the execution of this program to provide annex services to threads of the "calculation" type.

Also optionally a computer system according to the invention can comprise at least two central processing units, each for the interleaved execution of a plurality of threads throughout a plurality of virtual processors from said same central processing unit, and the handler for distributing the execution of threads can be designed to select one central processing unit for each thread to be executed, regardless of the virtual processors it has.

An object of the invention is also a method for managing the interleaved execution of a plurality of threads throughout a plurality of virtual processors from a same central processing unit of a computer system, comprising a step of distributing the execution of the threads throughout the virtual processors, characterized in that it comprises a preliminary step of classifying the threads to be executed according to a plurality of predetermined types, and in that, during the step of distributing the execution of the threads, each thread to be executed is directed to a virtual processor according to the type thereof.

Optionally, during the classification step, each thread is classified into a type based on a parameter identifying this type in a function of an application programming interface for managing the thread.

Also optionally, during the classification step, each thread is classified into a type based on a parameter identifying this type in a command for executing a program involving the execution of said thread.

An object of the invention is also the application of a method as defined above to the management of the execution of a plurality of threads over a plurality of processing nodes of a cluster of servers of the supercomputer type, wherein each processing node comprises at least one central processing unit having interleaved execution of a plurality of threads throughout a plurality of virtual processors from said same central processing unit.

Finally, an object of the invention is a computer program that can be downloaded from a communication network and/or recorded on a medium readable by computer and/or executable by a processor, particularly the operating system of a computer, characterized in that it comprises program code instructions for the execution of the steps of a method for managing the interleaved execution of a plurality of threads as defined above, when said program is executed on a computer.

BRIEF DESCRIPTION OF THE DRAWINGS

The invention will be better understood from the following description, provided solely by way of example, and with reference to the appended drawings in which:

FIG. 2 shows the successive general steps of a method for managing the interleaved execution of a plurality of computer processes that can be implemented by the arrangement of FIG. 1, according to an embodiment of the invention.

DETAILED DESCRIPTION

Figure 1:
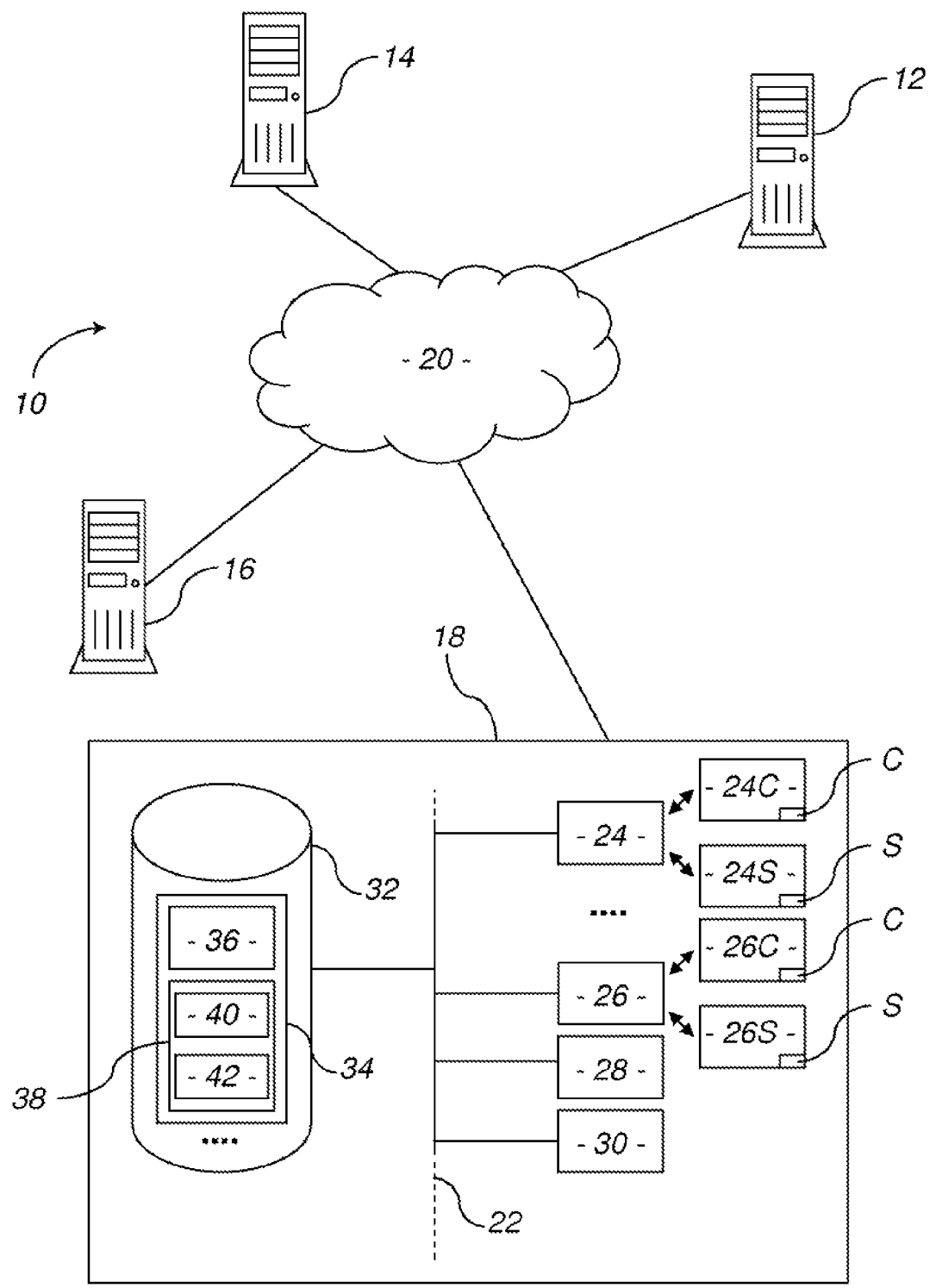
FIG. 1 schematically shows the general structure of an arrangement comprising at least one computer system according to an embodiment of the invention.

Irrespective of any application, the invention, one embodiment of which will now be explained in detail, can be implemented in any computer system having at least one central processing unit for the interleaved execution of a plurality of threads throughout a plurality of virtual processors from said same central processing unit and a handler for distributing the execution of the threads throughout the virtual processors.

In the simplest case, the invention can thus be implemented with a microprocessor integrating a hyper-threading mechanism. Real time calculation and/or embedded applications can thus benefit from it.

In more complex applications of networked computer devices or HPC supercomputers, each device comprising at least one microprocessor can advantageously implement the invention.

In the embodiment represented in FIG. 1, this is an HPC computer application which will be explained in detail to show an embodiment of the invention. It is an industrial application particularly important for the invention. But it is clear from the foregoing that the invention is not limited to such an HPC computer arrangement.

The arrangement 10 of computing devices 12, 14, 16, 18 shown in FIG. 1 is for example a very simplified and incomplete representation of an HPC computer organized as a cluster of servers interconnected by means of at least one very wide band data transmission network 20. This arrangement 10 comprises, for example, computing devices forming calculation nodes, identified by references 12, 14, 16 and 18, and computing devices forming nodes for service, administration or storage (not shown). The general structure of the calculation nodes 12, 14, 16 and 18 can be the same, but only the structure of the computing device 18 will be detailed below.

The computing device 18, for example a microcomputer type calculation server, comprises:

a communication bus 22 to which are connected a first central processing unit 24 and a second central processing unit 26 for the execution of computer processes from computer programs, and more particularly threads,
a read only memory (ROM) 28 and a random access memory (RAM) for storing processing data and/or startup programs (an application of the BIOS type, for example) and programs for management of peripherals, and
at least one hard disk 32.

Said computing device 18 possibly further comprises, in a conventional way not shown in this figure, one or more of the following items: a screen, a keyboard, a mouse, a communication interface with the network 20 and a device for reading/recording data on a removable medium, for example a CD-ROM or DVD read/write device.

The hard disk 32 stores, in the form of files, an operating system 34 such as the Linux system loaded by the BIOS application when the computing device 18 is started. A mechanism for the interleaved execution of threads throughout a plurality of virtual processors of a same central processing unit is activated by this operating system. For example, this mechanism is such that the central processing units 24 and 26 each have two virtual processors: the virtual processors 24C and 24S for the first central processing unit 24, and the virtual processors 26C and 26S for the second central processing unit 26.

Alternatively, the operating system 34 can be stored on external storage means (on an external medium such as a hard disk, on the network, etc.). In this alternative, the reader/recorder and the communication interface of the computing device 18 are capable of transferring data from an external medium to the hard disk 32 to allow the loading of the operating system 34.

In every case, the operating system 34 is a computer program that can be downloaded from a communication network and/or recorded on a medium readable by computer and/or executable by a processor, comprising program code instructions for the execution of the steps of a process for managing the interleaved execution of a plurality of threads that will be described with reference to FIG. 2.

More generally, the above-mentioned structure is suitable for any type of network of computing devices, not necessarily of the HPC type, in which the operating system of each computing device uses a mechanism for the interleaved execution of threads on virtual processors.

Finally, it will be noted that the computer 18 as it has just been structurally described is only one non-limiting example of a device capable of implementing the invention. There is a great diversity of architectures in computer design, and any device having at least one central processing unit for the interleaved execution of a plurality of threads throughout a plurality of virtual processors from said same central processing unit is suitable.

According to one embodiment of the invention, the computing device 18 comprises means 36 for classifying threads to be executed according to a plurality of predetermined types, and in particular according to two types of threads:
a first type of threads, referred to as "calculation", for a program intended to be executed by the computing device 18 so as to produce a result, relates to threads participating in the execution of this program for the direct production of the result, and
a second type of threads, referred to as "service", relates to threads participating in the execution of said program to offer annex services to the "calculation" type threads.

The service threads concern for example the saving of results, memory management, input/output management, data communication, monitoring, access to files, etc.

Depending on the applications, the classification means 36 can take different forms.

In a first application, a program to be executed requests the execution of several threads, some of which participate in calculation and others in the annex services. In this case, this program is designed to call an application programming interface function for managing threads, for example the sched_setscheduler( ) function of the POSIX application programming interface, based on a parameter identifying the calculation type (HT_CALCUL) or the service type (HT_SERVICE). The means 36 for classifying threads, implemented by the operating system 34, therefore consists of automatically recognizing this parameter in order to identify the type of a thread to be directed to a virtual processor.

In a second application, several programs are to be executed, some of them being calculation programs and others service programs. In this case, the user provides for launching the execution of a program by means of a command in which the type, calculation or service, is identified by parameter: for example the command can take the form of ht_sched-[CALCUL or SERVICE]<name of the program>. The means 36 for classifying threads, implemented by the operating system 34, then consist of automatically recognizing this parameter in order to identify the type of a thread requested by a program.

In a third application, an MPI (message passing interface) library, currently used in parallel calculation programs, creates a thread intended for services within the framework of a main program launched in calculation mode (see second application). In this case, it can call the setscheduler( ) function based on a parameter identifying the service type (HT_SERVICE). The means 36 for classifying threads, implemented by the operating system 34, then consist of automatically recognizing this parameter in order to identify the type of the thread created by this MPI library.

In a fourth application where the type of threads is not first specified as indicated previously, the classification means 36 of the operating system 34 can be designed to determine it automatically, even in summary form, particularly by automatic recognition of applications producing these threads.

Moreover, the computing device 18 comprises means for associating each virtual processor of a same central processing unit with one of the two above-mentioned types: as shown in FIG. 1, these association means are for example parameters C and S respectively identifying the calculation type or the service type. They are, for example, managed by the concerned central processing unit 24, 26, or alternatively, by the operating system 34, either explicitly or implicitly. Thus in the example shown schematically in FIG. 1, the virtual processor 24C of the first central processing unit 24 is of the calculation type, the virtual processor 24S of the first central processing unit 24 is of the service type, the virtual processor 26C of the second central processing unit 26 is of the calculation type, and the virtual processor 26S of the second central processing unit 26 is of the service type.

The operating system 34 includes a handler 38 for distributing the execution of threads throughout the virtual processors 24C, 24S, 26C and 26S. More specifically, said distribution handler 38 is designed to direct each thread to be executed to one of the virtual processors in accordance with its type, and still more specifically to a virtual processor whose type is identical to the thread's type. Therefore, a thread of the calculation type can only be directed to the virtual processor 24C or 26C and a thread of the service type can only be directed to the virtual processor 24S or 26S.

In practice, the distribution handler 38 comprises:
first software means 40 for selecting a central processing unit 24 or 26 for each thread to be executed, regardless of the virtual processors 24C, 24S, or 26C, 26S it has, and
second software means 42 for automatically assigning, from among the virtual processors of the selected central processing unit, the one that is of the same type as the thread to be executed.

A method for managing the interleaved execution of a plurality of computer processes implemented by the computer 18 of FIG. 1 will now be explained in detail, with reference to FIG. 2.

During a first classification step 100, threads T1, T2 and T3 awaiting execution are classified according to whether they are of the calculation type (right hatching) or of the service type (left hatching). This type can be defined a priori in control parameters or application programming interface functions and automatically recognized by the software means 36 of the operating system 34, as was explained in detail previously. The type can also be defined directly and automatically by the software means 36 of the operating system 34.

During the next step 102, the distribution handler 38 of the operating system 34 selects, by software means 40, a central processing unit 24 or 26 for each thread and places this thread in a queue of the selected central processing unit.

Next, during a step 104 of assigning each thread to a virtual processor performed by software means 42, each thread placed in the queue of a central processing unit 24 or 26 is automatically placed in a queue of the virtual processor of said central processing unit 24 or 26, which is of the same type as said thread.

Finally, during an execution step 106, each thread is executed by the virtual processor that was assigned to it in the preceding step.

It is clear that a computing device 18 like the one described above makes it possible to facilitate the management of execution of threads through a plurality of virtual processors.

In the prior art, the operating system, loaded onto a computer capable of implementing a mechanism of interleaved execution of threads on virtual processors, has all of the virtual processors as generic calculation media and makes the distribution of the threads more complex.

According to the invention, the distribution of threads by the operating system is simplified and more benefit is derived from the mechanism of interleaved execution of threads, particularly in an environment of heavy calculation demands such as a HPC supercomputer or a processor implementing a calculation application in real-time. More specifically, in the embodiment described above, two virtual processors of the same central processing unit are presented, not as two interchangeable calculation media, but as one main execution medium for the calculations and a secondary execution medium for the annex services. Thus, a generalized computing device 18 with N central processing units, even if it implements the mechanism of interleaved execution of threads, actually only presents to the user (and to the operating system) N central processing units, as if it were not implementing this mechanism. Consequently, benefit is derived from this mechanism without having to undergo management constraints thereof in the distribution of the threads.

The automatic assignment of threads to the virtual processor of the selected central processing unit makes it possible to distribute them throughout virtual processors based on their role and their constraints, and the user or operating system does not have to be involved in this distribution.

Once the threads are distributed, it is clear that the advantage of implementing the parallel execution mechanism on two virtual processors of the same central processing unit is based on the following points:
The central processing unit manages two different queues and therefore has no need to manage the changeover of one thread to another, this simultaneous execution being managed by the hardware,
In particular, when there is only one thread left to execute per virtual processor, the central processing unit can allow the virtual processors to execute the code without interrupting them,
The changeover from one program to another is done instruction by instruction.

This very fine granularity can prove beneficial, especially in the case of daemons that can cause disturbances. Indeed, the calculation virtual processor of a same central processing unit will be slowed down but not blocked during a constant time by the service virtual processor. The effect of disturbances (daemons and interruptions) is then greatly reduced in favor of the calculation virtual processor.

In an HPC environment, the calculation code can therefore be positioned on the calculation virtual processor and the annex services on the service virtual processor and this can be done, in a transparent manner, for operating tools such as batch managers. In a real-time environment, this makes it possible to isolate automatically a critical thread from all other service threads, guaranteeing it at least 50% of the available execution time on the selected central processing unit and with no interruption due to scheduling.

Finally, for compatibility of the computing device 18 with programs that do not accommodate this functionality of assigning a priori a type to each thread, it seems clear that by default the threads must be directed to a service virtual processor. Indeed, all of the daemons launched by the operating system must be executed on a service virtual processor in order not to disturb the calculation. Only the calculation code must therefore be specifically adapted to direct its threads to a calculation virtual processor. This adaptation is not necessarily done from the program itself, but can be performed in external tools, such as the above-mentioned MPI libraries for example.

Furthermore, it will be noted that the invention is not limited to the embodiment described above. In particular, if each central processing unit is capable of implementing a mechanism allowing it to present more than two virtual processors, it can be of advantage to define more than two types of threads.

It will also be noted, as was suggested several times previously, that the HPC supercomputer arrangement shown in FIG. 1 is not the only one in which the invention can be implemented. In a much simpler configuration, for example real-time and/or embedded processing, the invention can be implemented as soon as there is a single processor (or a computer having such a processor) comprising at least one central processing unit for the interleaved execution of a plurality of threads throughout a plurality of virtual processors.

More generally, it will be clear to a person skilled in the art that various modifications can be made to the embodiment described above, in the light of the teaching that has just been disclosed. In the following claims, the terms used must not be interpreted as limiting the claims to the embodiment set forth in the present description, but must be interpreted to include all of the equivalents that the claims seek to cover by their formulation, the provision of which enables the person skilled in the art, by applying his general knowledge, to implement the teaching that has just been disclosed.

The invention claimed is:

1. A computer system for managing the execution of threads, comprising:
   at least one central processing unit comprising a first virtual and second virtual processor, the at least one central processing unit configured to perform interleaved execution of a plurality of threads throughout the first and second virtual processor, the interleaved execution being performed such that when a current thread is in a waiting state, the central processing unit automatically executes another thread;
   means for classifying the threads to be executed according to a predetermined first thread and second thread type;
   means for associating the first virtual processor with the first thread type and the second virtual processor with the second thread type;
   a handler configured to distribute the execution of the threads throughout the first and second virtual processor of the at least one central processing unit, in which the handler distributes the execution of the threads by directing each thread to be executed to one of the first and second virtual processors based on whether the thread has been classified as being of the same predetermined type as the virtual processor, wherein the first thread type is a calculation thread type associated with threads participating in the execution of a program intended to be executed by the computer system to provide a result for the direct production of the result, and the second thread type is a service thread type associated with threads participating in the execution of said program to provide annex services to threads of the calculation type.

2. The computer system according to claim 1, wherein the at least one central processing unit comprises at least two central processing units each having several virtual processors and configured to perform interleaved execution of a plurality of threads throughout said virtual processors, and
   wherein the handler which distributes the execution of the threads is configured to select a central processing unit for executing each thread regardless of virtual processors has associated with said selected central processing unit.

3. The computer system of claim 1, wherein the annex services comprise at least one of saving of results, memory management, data communication, monitoring, and access to files.

4. A method for managing the interleaved execution of a plurality of threads by at least one central processing unit comprising a first and second virtual processor, the interleaved execution being performed such that when a current thread is in a waiting state, the central processing unit automatically executes another thread, the method comprising:
   classifying the threads to be executed according to a predetermined first thread and second thread type;
   associating the first virtual processor with the first thread type and the second virtual processor with the second thread type; and
   distributing execution of the plurality of threads throughout the first and second virtual processor, in which the distributing the execution of the threads includes directing each thread to one of the first and second virtual processors of the at least one central processing unit based on whether the thread has been classified as being of the same predetermined type as the virtual processor, wherein the first thread type is a calculation thread type associated with threads participating in the execution of a program intended to be executed by the computer system to provide a result for the direct production of the result, and the second thread type is a service thread type associated with threads participating in the execution of said program to provide annex services to threads of the calculation type.

5. The method according to claim 4, wherein, during the classification step, each thread is classified into one of the predetermined first and second thread types based on a parameter identifying said type in a function of an application programming interface configured to manage the thread.

6. The method according to claim 4, wherein, during the classification step, each thread is classified into one of the predetermined first and second thread types based on a parameter identifying said type in a command for executing a program involving the execution of said thread.

7. The method according to claim 4, wherein said computer system comprises a plurality of processing nodes of a cluster of supercomputer type servers,
   wherein said method further comprises managing the execution of said plurality of threads over the plurality of processing nodes of the cluster of supercomputer type servers, and
   wherein each of the processing nodes comprises at least one central processing unit configured to perform interleaved execution of the plurality of threads throughout the plurality of virtual processors of the same central processing unit.

8. The method of claim 4, wherein the annex services comprise at least one of saving of results, memory management, data communication, monitoring, and access to files.

9. A non-transitory computer readable medium upon which is embodied a sequence of programmable instructions downloadable from a communication network and which, when executed by a processor, causes the processor to perform the interleaved execution of a plurality of threads throughout a first and second virtual processor of a central processing unit of a computer system, the interleaved execution being performed such that when a current thread is in a waiting state, the central processing unit automatically executes another thread, comprising:
   classifying the threads to be executed according to a predetermined first thread and second thread type;
   associating the first virtual processor with the first thread type and the second virtual processor with the second thread type; and
   distributing execution of the plurality of threads throughout the first and second virtual processor, in which the distributing the execution of the threads includes directing each thread to one of the first and second virtual processors of the at least one central processing unit based on whether the thread has been classified as being of the same predetermined type as the virtual processor, wherein the first thread type is a calculation thread type associated with threads participating in the execution of a program intended to be executed by the computer system to provide a result for the direct production of the result, and the second thread type is a service thread type associated with threads participating in the execution of said program to provide annex services to threads of the calculation type.

10. The computer readable medium according to claim 9, wherein, during the classification step, each thread is classified into one of the predetermined first and second thread types based on a parameter identifying the type in a function of an application programming interface configured to manage the thread.

11. The computer readable medium according to claim 9, wherein, during the classification step, each thread is classified into one of the predetermined first and second thread types based on a parameter identifying the type in a command for executing a program involving the execution of said thread.

12. The computer readable medium of claim 9, wherein the annex services comprise at least one of saving of results, memory management, data communication, monitoring, and access to files.

* * * * *

UNITED STATES PATENT AND TRADEMARK OFFICE
CERTIFICATE OF CORRECTION

PATENT NO. : 9,436,510 B2  
APPLICATION NO. : 13/497766  
DATED : September 6, 2016  
INVENTOR(S) : Philippe Couvee et al.

Page 1 of 1

It is certified that error appears in the above-identified patent and that said Letters Patent is hereby corrected as shown below:

On the title page, Item (75) Inventors:

Please correct inventor Simon DERR's residence information to read:

Saint Martin d'Heres (FR)

Signed and Sealed this  
Twenty-fifth Day of October, 2016

Michelle K. Lee  
*Director of the United States Patent and Trademark Office*